United States Patent [19]

Osgar

[11] Patent Number: 4,929,293
[45] Date of Patent: May 29, 1990

[54] WELDING FLUOROPOLYMER PIPE AND FITTINGS

[75] Inventor: Michael L. Osgar, Eagan, Minn.

[73] Assignee: Fluoroware, Inc., Chaska, Minn.

[21] Appl. No.: 881,969

[22] Filed: Jul. 3, 1986

Related U.S. Application Data

[63] Continuation of Ser. No. 628,784, Jul. 9, 1984, abandoned.

[51] Int. Cl.$^5$ .............................................. B29C 27/06
[52] U.S. Cl. ................................. 156/158; 156/273.3; 156/304.2; 156/304.5; 156/304.6
[58] Field of Search ...................... 156/158, 159, 304.2, 156/304.5, 304.6; 4/33, 502, 273.3, 380.9; 219/553

[56] References Cited

U.S. PATENT DOCUMENTS

| | | | |
|---|---|---|---|
| 2,665,738 | 1/1954 | Caskin | 156/499 |
| 3,013,925 | 12/1961 | Larsen | 156/304.6 |
| 3,883,369 | 5/1975 | Badger et al. | 156/380.9 |
| 4,253,500 | 3/1981 | Williams | 156/275.1 |

FOREIGN PATENT DOCUMENTS 2549475  3/1977  Fed. Rep. of Germany ... 156/364.6

*Primary Examiner*—Michael Ball
*Attorney, Agent, or Firm*—Palmatier & Sjoquist

[57] ABSTRACT

The method of joining together the ends of ducts made of melt processible fluoropolymers such as Teflon PFA, which are characterized by a high degree of chemical inertness and a continuous service temperature in the range of 300° to 500° F. The joining of the ends together is accomplished by the use of infrared heat emanating from an infrared heat source with temperatures in the range of 1250° to 2000° F. and spaced from the ends of the duct by approximately ¼" to 2 inches for a period of time approximately up to one minute which may be gauged by the appearance of the duct end as it becomes visibly molten to a depth of approximately ⅛". The infrared heater is then removed and the ducts are put together under almost no pressure and the ducts are held briefly, in one form, less than a minute, to quickly establish a joint that becomes at least as strong and expectedly stronger than the original ducts.

10 Claims, 2 Drawing Sheets

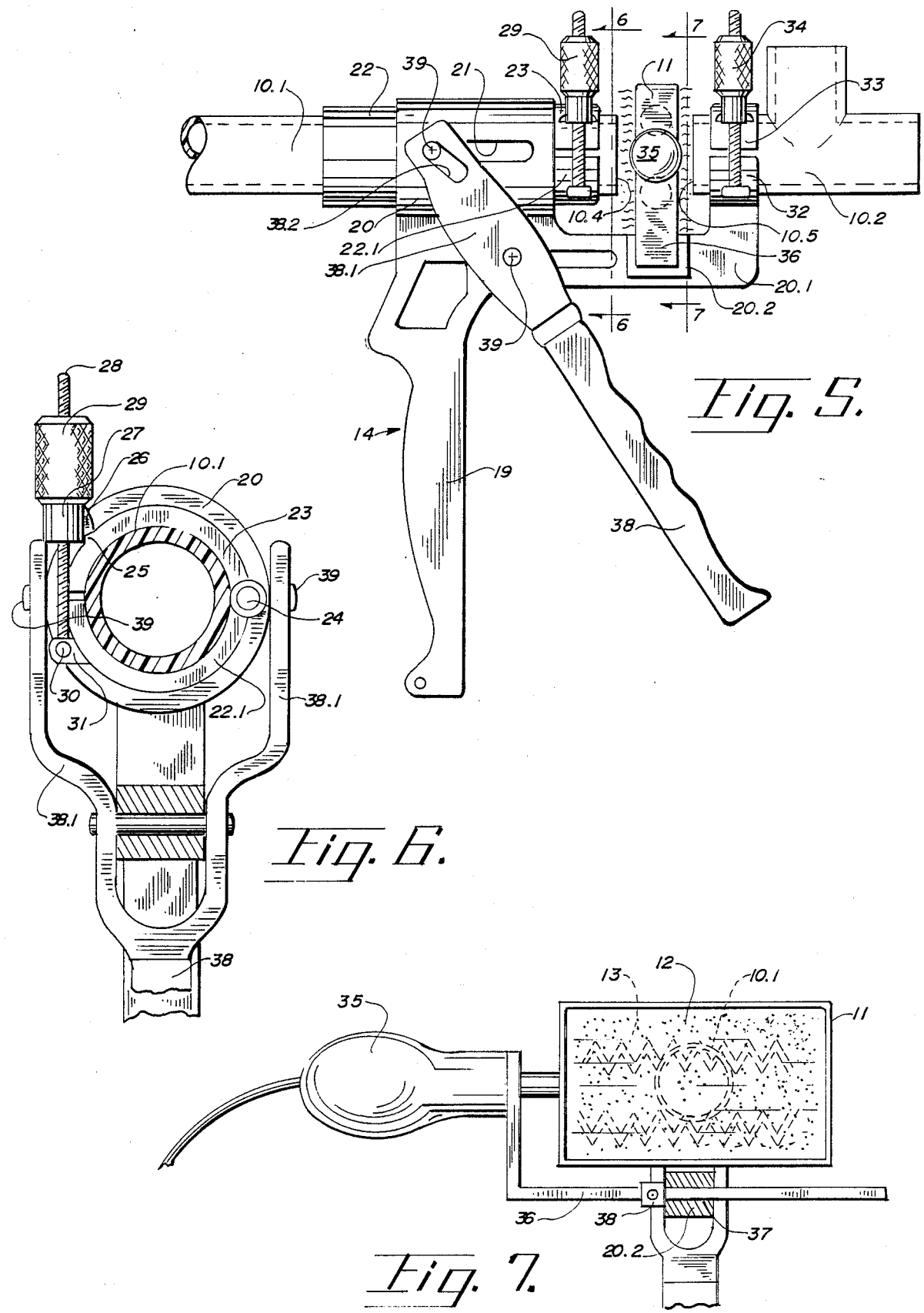

WELDING FLUOROPOLYMER PIPE AND FITTINGS

This is a continuation of co-pending application Ser. No. 628,784 filed on July 9, 1984, now abandoned.

This invention relates to welded joints or connections between pipes and ducts made of fluoropolymers, such as Teflon PFA, FEP and Tefzel and related materials.

BACKGROUND OF THE INVENTION

Thermoplastic materials have been known for many years. Such thermoplastic materials as polyethylene and polypropylene are commonly used in injection molding of useful articles and are commonly extruded into strands or filaments, in thin sections into film, and in much thicker sections into tubing and pipe.

Such tubing and pipe, and many types of plastic articles, must be connected to one another in order to be useful. For the most part, such connections have been accomplished through the use of mechanical pressure type devices. U.S. Pat. Nos. 3,195,933; 3,501,177 and 3,977,708 show a number of such mechanical and pressure type devices incorporating threads and tubing deforming devices applying substantial pressure. These are typical of the connections used between tubing or pipes and between plastic pipes and plastic valves or other fittings; also see U.S. Pat. Nos. 4,185,807 and 4,343,456 for plastic valves to be connected to plastic pipes.

Such mechanical and pressure type connections are used on all plastics, including polyethylene and polypropylene, and also including perfluoroalkoxy (PFA) fluorocarbon resin known by its trademark Teflon, of Du Pont, Wilmington, Del.

Connections between thermoplastic articles (including tubes and pipes) have also been created by certain types of welding. For instance, spin welding is accomplished by rapidly spinning one plastic part relative to another, thereby creating heating to fusion and resulting in welding the mating faces of the articles together. Some welding has been accomplished of certain plastics by the use of solvents which soften the joint area of the plastic article which may be inserted into or may embrace similar plastic parts, and will be welded thereto as the solvent evaporates and the plastic is again hardened or cured.

Welding of thermoplastic pipes together has been accomplished, as disclosed in U.S. Pat. No. 3,013,925, by inserting a heated platen between the ends of lined pipes and causing the pipes to bear against the heated platen to fuse the plastic after which, the platen is removed and the pipes are pressed together under pressure until welding has occurred and the thermoplastic material has hardened again as it cools. Other patents, such as U.S. Pat. Nos. 3,729,360: 4,263,084; 3,727,289; and 3,616,024 illustrate this same welding process.

Similarly, welding of pipes and solid plastic articles is shown to have been effected in U.S. Pat. No. 3,276,941 by contacting the ends of the articles or pipe by a heated element; and in U.S. Pat. No. 3,998,682, peripheral heaters embrace the peripherals of a pipe and connector fitting made of two different types of plastic; and U.S. Pat. No. 3,117,903 discloses the heating of the ends of pipes by inserting them into a hot glycerine bath prior to end to end assembly where welding occurs.

In U.S. Pat. Nos. 3,404,051 and 3,968,195, an open flame is used for fusinq nylon rope and for melting a closure disc respectively to accommodate welding. In U.S. Pat. No. 3,968,195, the open flame actually embraces the closure disc to be melted and the ends of the thermoplastic tube, which is to be welded to a similar plastic tube, also in the open flame. Of course, the products of combustion may collect on the plastic.

In U.S. Pat. No. 3,796,625, there are disclosures of the use of radiant heat used to weld the edges of plastic film together In U.S. Pat. No. 3,383,267, it is suggested that the radiant heat welding can be used to weld films of Teflon PTFE and FEP. However, it is known that Teflon PTFE will not bond to itself.

Radiant heat is also employed in U.S. Pat. No. 2,665,738 to heat the edges of plastic workpieces, the surfaces of which are softened by the heat radiating from a heating element without actually touching the heating element to the plastic. In no way does this relate to making leak-proof, secure joints.

Plastics made of fluoropolymers of various types have only recently been used in the manufacture of fittings for pipes and tubing of the same material. Such fittings include valve housings, tees, elbows. Such fluoropolymers are different than earlier thermoplastics, such as polyethylene and polypropylene, in that they withstand service temperatures in the range of 300° to 500° F. in contrast to the service temperatures of less than 175° F. for components of most elastomers and plastics.

There has been no butt welding of plastic components or ducts or pipes made of fluorocarbons which are also melt processable thermoplastics and particularly, perfluoroalkoxy, known as Teflon PFA, or of fluoroethylenepolymer, known as Teflon FEP, or of polytetrafluoroethylene, known as Teflon PTFE.

Early fluorocarbon resins were developed in 1938, and were known as TFE or PTFE, more specifically known as polytetrafluoroethylene. Although this material was loosely referred to as a thermoplastic, it did not act like other thermoplastics. PTFE, when melted, does not flow like other thermoplastics and it cannot be injection molded. Rather, it must be shaped initially by techniques similar to powder metallurgy. PTFE will not bond to itself in any welding process. Important attributes of PTFE are that it has a high continuous service temperature, approximately 260° C. or 500° F., and has a high degree of chemical inertness.

The next improved fluorocarbon resin was put on the market in 1960, and was known as FEP, or fluoroethylenepolymer. This material is melt processible, and therefore may be injection molded and extruded by melt processing. However, molding of FEP is extremely difficult and requires that the molds be of special design. FEP is extremely difficult to injection mold, and no commercially sold pipe fittings or valves were made of it. This material is known for its high degree of chemical inertness and for its high continuous service temperature of 205° C., 400° F.

Subsequently, an improved material known as PFA or perfluoroalkoxy was brought to market in 1972. This new material is melt processible and may be more easily injection molded and extruded. Pipes and tubing of this material have been found useful because of the high degree of chemical inertness. However, fittings and appliances have been joined only by threaded or pressure type joints. The surface of the material when molded is extremely smooth. Adhesive bonding of PFA articles is widely used, but only after the surface is chemically etched and anhydrous solutions of elemental sodium which removes fluorine from the polymer molecule. PFA is widely used because of its high degree of chemical inertness, low absorption, and high continuous service temperature of 260° C., 500° F. as linings for pipes and ducts and pumps.

SUMMARY OF THE INVENTION

A feature of the present invention is the method of producing butt welds between pipes or ducts of fluoropolymers, which are extremely chemically inert and which have continuous service temperatures in the range of 300° to 500° F. or more, by simultaneously applying infrared or radiant heat to the ends of the pipes or fittings to be welded but without touching the ends being radiated. The radiant heat is derived from a flat faced electric quartz infrared heater which has a surface temperature in excess of 1600° F. and which maintained for fifteen to forty five seconds at a spacing of approximately one-fourth to one-half of an inch from the end face of the duct. The time varies with the size of the pipe being welded; and the heater to pipe spacing may vary widely, from 0.125 inch to as much as 2.0 inches.

Where, herein, the word duct is used, the intention is to include pipes and tubes, rigid and flexible, and other fittings, valves, appliances and bosses with tubular ends to connect to such pipes, tubes and fittings.

Preferably, the ends of the ducts to be welded have flat annular end faces lying normal to the duct axis; and the ducts are preferably chamfered at the inner periphery of the end face. After the duct ends have been shaped and chamfered, the end faces may be wiped with a cleaner such as alcohol.

The heater emits high energy in a wavelength which is readily absorbed by this fluoropolymer or fluorocarbon resin material which is extremely chemically inert and has a continuous service temperature of 300° to 500° F. Infrared is applied until the end portion of the duct is fused or molten to a depth of approximately 0.125 from the annular end face. As heating continues, the appearance of the duct changes in the molten portion, which becomes nearly clear and less milky than the adjoining unfused portions. The combined effect of the nature of the fluoropolymer or fluorocarbon resin material and the lack of anything physically touching the molten portion, results in the molten end portion of the duct retaining its shape.

When the end portions of the ducts have become fused or molten as described, the radiant heater is removed and the aligned duct ends are pressed together whereupon the molten material in the duct ends flows together and produces a high quality leak-proof joint between the duct ends. The duct ends are held rigidly until the joint solidifies, about 15 to 45 seconds in most cases. Cooling to room temperature may require an additional 10 to 15 minutes.

Such welding of fluoropolymer or fluorocarbon resin articles is not limited to pipes and tubes, but is also useful for welding fittings such as elbows and tees, appliances such as valves, and tubular bosses molded into panels, container walls or housings.

The joint produced may be essentially smooth at the inner periphery, without a large flow obstructing bead or annular ribs.

By joining fluoropolymer or fluorocarbon resin ducts together utilizing the method described, the ducts maintain a high degree of sterility.

Such sterility is important because in most cases, it is the sterility and the chemical inertness of the material in the pipes that are the principal factors forming the basis of a decision to use pipes of this material.

The sterility is promoted and maintained by the high temperatures which may be used at the surface of the heating element in order to fuse the pipe ends. The high temperatures applied to the pipe ends will destroy any organic contaminants present and will minimize the likelihood of any other contaminants collecting in the pipe ends.

The sterility is also promoted and maintained by the continued physical isolation of the pipe ends from the heating element and from other physical media which, if touched by the pipe ends, could contaminate the pipe.

Furthermore, the sterility is promoted and maintained because the joint produced adopts a shape at its inner periphery which is very nearly the same as the shape of the adjacent inner periphery of the pipe. Accordingly, the likelihood of contaminants collecting within the pipe and at the joint is minimized.

Further, by joining the fluoropolymers or fluorocarbon resin ducts in the method described, which was previously not available, the joints are physically strong and thoroughly and permanently sealed against leakage. The plastic is not subject to deterioration or discoloration.

DESCRIPTION OF THE DRAWINGS

FIG. 5 is a side elevation view of a tool being used to join the fluoropolymer ducts according to the present invention.

FIG. 6 is an enlarged detail section view taken approximately at 6—6 of FIG. 5.

FIG. 7 is a detail section view taken approximately at 7—7 of FIG. 5.

DETAILED SPECIFICATION

Figure 1:
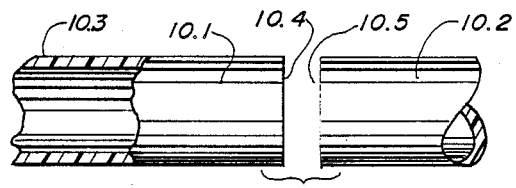
FIG. 1 is a detail elevation view, with portions shown in section, of fluoropolymer pipes which are being joined together according to the present invention.
Figure 2:
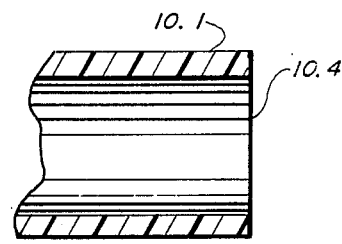
FIG. 2 is an enlarged detail section view through the end of one of such pipes prior to being joined to another similar pipe.

As previously asserted herein, the ducts or pipes 10.1 and 10.2 illustrated in FIG. 1 are formed of a fluoropolymer material which is extremely chemically inert, and has a continuously service temperature in the range of 300° to 500° F. Both of the pipes or ducts 10.1 and 10.2 are made of identical materials. The exact material may be any of a number of fluoropolymers that are currently available, and may be formed of fluorocarbon resins known as perfluoroalkoxy (PFA) or fluoroethylenepolymer (FEP). Both of these materials are known by their trademark Teflon, owned by E. I. du Pont de Nemours & Co., of Wilmington, Del. Also other similar fluoropolymer materials may be used, such as ethylenetetrafluoroethylene (ETFE), known by its trademark Tefzel, owned by du Pont, and ethylene-chlorotrifluoroethylene (ECTFE) also known as Halide, a trademark owned by Allied Corp., Morristown, N.J., and polyvinylidenefluoride (PVDF), also known by the trademarks Kynar, owned by Pennwalt Corp., Philadelphia, Penna., and by the trademark Solef, owned by Solvay, Rue de Prince Albert 44, 1050 Bruxelles, Belgium, and other fluoropolymer materials. The ducts 10.1 may be flexible or rigid and may have a size in the general range of ¼th inch to two inches, I.D. more or less, and without limitation. The thickness of the wall 10.3 of the duct may also vary widely, but is self supporting and does not hang limp like a film. One typical wall thickness of a rigid ⅜th I.D. pipe is approximately 0.100 inches. In preparing the ends of the ducts 10.1 and 10.2, the end face 10.4 thereof is shaped as to be flat and planar and lie normal to the axis of the duct. It will be recognized that both of the ducts 10.1 and 10.2 may be actual pipes, or one may be a pipe and the other a fitting, such as a T-fitting or elbow, or one may be the duct portion of an appliance or valve into which fluid is to flow.

In most cases where a fluoropolymer material is chosen for use in the ducts, it is sterility that is of primary concern and of course, in forming the joint between adjacent ducts 10.1 and 10.2, the maintenance of sterile conditions is highly important. In FIGS. 5, 6, and 7, the joining of ducts 10.1 and 10.2 is illustrated; and in this instance, it is assumed that the duct 10.2 is a T-fitting, also for connection with other similar pipe or ducts.

In this illustration, the end faces 10.4 and 10.5 of the two ducts are arranged in aligned and confronting relation to each other. The end faces 10.4 and 10.5 are both flat and planar and perpendicular to the axes of the ducts, and the end faces are spaced far enough apart as to receive a heater 11 therebetween. The heater 11 has a flat block-like shape and may be formed of any of a number of suitable materials, which, when heated, will glow and emit infrared from their flat surfaces 12, which confront the end faces 10.4 and 10.5 of the ducts. The heater module 11 may be formed of ceramic material or may be a quartz heater with electric heating elements 13 embedded in the surface of the heater. The temperature at the surfaces 12 of the heater may vary, according to the amount of electrical energy applied, and it has been found successful to utilize surface temperatures of the heater in the range of 1250° to 2000° F.; and in most instances, the surface temperature at the heater will not exceed 1700° Preferably, it is found that the surface temperature of the heater should be maintained in the range of 1600° to 1700° F. where the spacing between the faces 12 of the heater 11 and the end faces 10.4 and 10.5 of the ducts is maintained in the range of ¼th to ⅜ths of an inch. In most instances, it is found that the preferred spacing between the heater and the end faces of the ducts will be approximately one-half inch. Spacings as little as ⅛th of an inch and as much as two inches has been used successfully, however, when the small spacing are used, there is more likely to be deterioration or burning of the plastic in the duct and when the spacing is too large, the time required to produce fusing is prolonged.

With the preferred spacings and heater temperatures, the infrared heat is radiated onto the end portions of the ducts for a period of approximately 30 to 60 seconds in most instances, and it is preferred that the spacing be arranged so that heating time will be approximately 45 seconds. As a result, the exact heating is not extremely critical. Heating is continued of the duct ends until the end portions of the ducts 10.1 and 10.2, within approximately ⅛th of an inch of the end faces 10.4 and 10.5 becomes fused. Fusion of the end portions of the ducts becomes visibly apparent because the normally milky and opaque nature of the fluoropolymer material in the duct changes to an essentially clear appearance when the material is fused or molten. Fusion to a depth of about 0.125 inch from the end face 10.4, 10.5 is adequate. The nature of the fluoropolymer material in the ducts 10.1 and 10.2 causes the fused portion at the ends of these ducts to maintain its shape while molten.

When the necessary degree of fusion, as described, has been accomplished, the heater 11 is removed from the space between the end faces of the ducts, and the ducts 10.1 and 10.2 are subjected to relative movement toward each other while the ducts are maintained in alignment. The end faces of the ducts are moved into engagement with each other and are actually pressed slightly to each other, whereupon the end faces of the ducts are welded to each other.

It should be recognized that the close spacing between the faces 12 of the heater and the end faces 10.4 and 10.5 of the ducts will transmit infrared into the ducts as to cause the rapid fusing of material in the duct ends. In addition, exposure of the duct ends to the high temperatures and infrared from the heater has an extremely good sterilizing effect on the duct ends, but because of the high service temperature of the material in the ducts, the ducts are not damaged or caused to deteriorate. The material in the ducts will withstand these extremely high temperatures temporarily to accommodate the combined fusion and sterilization. The high temperatures at the faces of the heater 11 will cause any organic contaminants which might be found on the duct ends to be eliminated; and any material, such as alcohol, which might be used to wipe off the duct ends before being exposed to the fusing temperatures, is also quickly dissipated. Because of the nature of the material in the ducts 10.1 and 10.2, the fused duct ends maintain their shape and configuration, and the flat end faces 10.4 and 10.5 remain substantially flat so that when the duct ends are pressed together, welding across the entire end faces occurs instantly, thereby producing a complete and thorough joint which, when allowed to cool, is integral with all of the material in both duct ends and, substantially as illustrated in FIGS. 3 and 4.

Figure 3:
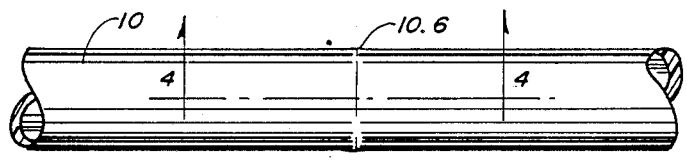
FIG. 3 is an elevation view illustrating the pipes of FIG. 1 after they have been joined together.
Figure 4:
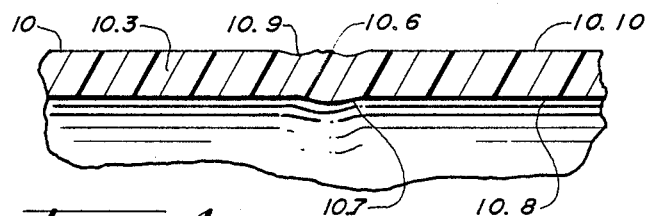
FIG. 4 is an enlarged detail section view taken approximately at 4—4 of FIG. 3 and illustrating the joint produced according to the present invention.

When the fused duct ends which are welded together into a common duct 10 as indicated in FIGS. 3 and 4, the joint 10.6 which has been produced has a shape almost identical to the shape of the remainder of the duct walls 10.3. A slight bead 10.7 is formed on the inner face 10.8 of the duct; and a slight undulation 10.9 in the shape of the exterior surface 10.10 of the duct wall will be produced.

Because only a minimum amount of pressure endways of the ducts is necessary to produce welding while the fluoropolymer material is fused, there will only be an absolute minimum of deformation at the inner surface 10.8 as illustrated in FIG. 4, and accordingly, no crevices or distinctly shaped ribs or beads at the inner periphery of the pipe will be formed, which could otherwise cause the collection of contaminants during later use of the pipe.

Although in FIGS. 5, 6, and 7, a tool 14 is used to hold the duct ends in spaced and aligned relation with each, during heating, the holding of the duct ends in aligned relation during heating is not absolutely essential, so long as the duct ends are aligned with each other immediately after the removal of the heater from the area of the end faces of the ducts and while the material in the duct ends remains molten.

Figure 8:
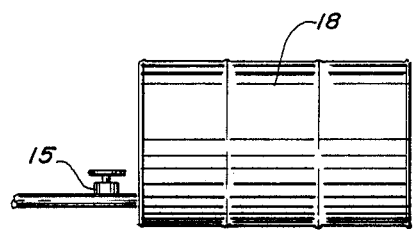
FIG. 8 is a detail elevation view of a barrel or large container to which a valve and pipe have been connected.
Figure 9:
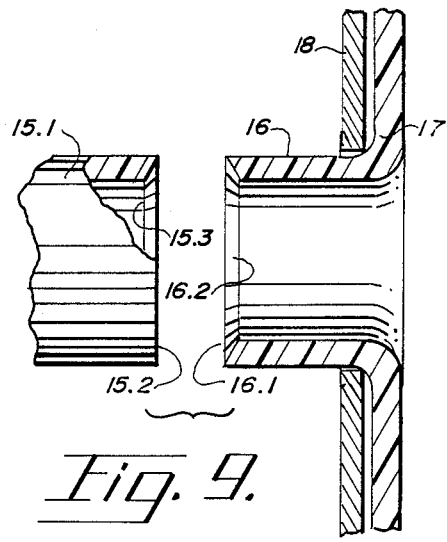
FIG. 9 is an enlarged detail section view illustrating the barrel lining and duct which is to be connected to the barrel to produce the flow connection illustrated in FIG. 8.

FIGS. 8 and 9 illustrate that the method of joining fluoropolymer ducts to each other is suitable for use with other types of ducts which may be incorporated into a valve 15 and in the access boss 16 of a fluoropolymer lining 17 of a barrel 18. In FIG. 9, the connector end 15.1 of a valve housing for the valve 15 is shown in alignment with the access boss 16 formed in the liner end wall 17 within the barrel 18. In this instance, the end faces 15.2 and 16.1, respectively, are formed with chamfers 15.3 and 16.2 on their inner peripheries. When the infrared heat is applied in the manner described to these duct ends in FIG. 9, the heat is applied until the duct ends are fused at least to the full depth of the chamfers in a direction inwardly from the end faces 15.2, 16.1. In some instances, it has been found that the use of a chamfer will desirably change the shape of the joint formed at its inner periphery as to minimize the likelihood of producing any bead or unnecessary undulation.

Although the use of the particular tool 14 illustrated in FIGS. 5–7 is not required, the use of a comparable jig, fixture or tool is desirable. The tool 14 has a handle 19 which is formed integrally of the frame 20 which is generally tubular in configuration and has slots 21 formed in both opposite sides of the tubular frame. A tubular slide 22 is confined within the tubular frame 20 to receive the duct 10.1. The inner end 22.1 is formed integrally of the tubular slide and is semi-circular in shape. A complementary semi-circularly shaped clamping half ring 23 is hinged at 24 to the tubular slide for clamping the end portion of the duct 10.1. The clamping half ring 23 has a lug 25 on its side to engage a hold down locking lug 26 on a sleeve 27 guided along a threaded rod 28 and held down by a internally threaded nut 29 which is threaded onto the rod 28. The bottom end of rod 28 is swingably mounted by a pivot 30 onto a mounting ear 31 formed integrally of the slide 22.

The frame 20.1 of the tool extends forwardly to mount a similar duct supporting cradle 32 to which the half clamping ring 33 is attached by a pivot and in a similar manner that the half clamp ring 23 is also attached as illustrated in FIG. 6. The securing nut 34, like nut 25, clamps the duct in stationary relation with respect to the frame 20.

The heater 11 has a wooden handle 35, and a mounting bar 36 insertable through a slide opening 37 in the lower frame portion 20.2. A stop lug 38 on the bar 36 limits the sliding of the bar through the frame as to accurately position the heater in confronting relation with the duct ends.

The swingable handle 38 is swingably mounted on a stationary pivot 39 which is rigid with the frame 20; and the upper end of the handle is bifurcated so that the ends 38.1 which have slots 38.2, will receive the driving pin 39 which protrudes from the side of the slide 22. When the handle 38 is gripped and swung, the upper end of the handle will move the slide 22 forwardly, as to cause the ends of the ducts to be pressed together after the heater 11 has been removed.

It will be seen that the present invention provides a means which was previously unavailable for joining together ducts of fluoropolymer materials, such as perfluoroalkoxy and fluoroethylenepolymer, in an extremely sterile and leaktight arrangement to continue the purpose for which these materials were selected for use in the piping system which relies on the extreme or high degree of chemical inertness of the material in obtaining sterility.

What is claimed is:

1. The method of joining together the ends of tubular flow ducts of melt processible fluoropolymers which material has a high degree of chemical inertness and continuous service temperatures in the general range of 300° to 500° F., consisting in the steps of shaping the end faces of the ducts to lie flat and normal to the duct axis, placing a flat faced infrared heater in confronting relation with the duct ends and spaced therefrom by a distance in the range of up to two inches, maintaining the heater face at temperatures in the range of 1250° to 2000° F. and at the duct ends for a period up to sixty seconds until the fluoropolymer material in the duct becomes visibly molten to depths of up to one-eigth inch from the end faces of the ducts, removing the heater from the duct ends, and immediately moving one of the duct ends into engagement with the other duct end, and with only a minimum of pressure pressing and holding the duct ends together for a period up to forty-five seconds until the molten duct material solidifies again.

2. The method of joining fluoropolymer duct ends according to claim 1 and producing chamfers on the inner peripheries of the duct ends.

3. The method of joining fluoropolymer duct ends according to claim 1 wherein the heater face is maintained at temperatures in the range of 1250° to 1750° F., while confronting the duct ends.

4. The method of joining fluoropolymer duct ends according to claim 1 wherein the heater face is maintaining at temperatures in the range of 1600° to 1700° F. while confronting the duct ends.

5. The method of joining fluoropolymer duct ends according to claim 1 wherein the melt processible fluoropolymer has a milky and opaque appearance, and maintaining the heater face at the duct ends for a period up to forty five seconds until the end portion of the duct changes from a milky appearance to a clear appearance.

6. The method of joining fluoropolymer duct ends according to claim 1 and maintaining a spacing between the duct ends and the heater in the range of up to one-half inch.

7. The method of joining fluoropolymer duct ends according to claim 1 and wherein said duct ends are up to two inches in diameter.

8. The method of joining fluoropolymer duct ends according to claim 1 wherein the ducts are formed of a fluorocarbon resin known as perfluoroalkoxy.

9. The method of joining fluoropolymer duct ends according to claim 1 wherein the ducts are formed of a fluorocarbon resin known as fluoroethylenepolymer.

10. In the art of joining together the ends of tubular flow ducts of fluorine based materials including fluoropolymers, and including fluorocarbon resins identified as fluoroethylenepolymer and perfluoroalkoxy, which are highly chemically inert and have continuous service temperatures in the range of 300° to 500° F., the method steps consisting of shaping the end faces of the ducts to lie flat and normal to the duct axis, arranging an electrically heated flat faced infrared heater with a temperature of 1250° to 1700° F. and with the glowing faces in confronting and closely spaced relation with the aligned ends and spaced from such ends up to about one-half inch, maintaining the heater between the duct ends for up to forty-five seconds and until the end portions of the duct become visibly molten to depths of up to one-eigth of an inch from the end faces of the ducts, removing the heater from the duct ends, and immediately moving one of the duct ends into engagement with the other duct end, and with only a minimum of pressure pressing and holding the duct ends together until the molten portion of the duct solidify again.

* * * * *

UNITED STATES PATENT AND TRADEMARK OFFICE
CERTIFICATE OF CORRECTION

PATENT NO. : 4,929,293

DATED : May 29, 1990

INVENTOR(S) : Michael L. Osgar

It is certified that error appears in the above-identified patent and that said Letters Patent is hereby corrected as shown below:

In the Abstract, at line 12, delete "1/2"" and substitute --1/8"--.

In column 2, line 9, delete "3,383,267" and substitute --3,383,265--.

Signed and Sealed this

Eleventh Day of February, 1992

Attest:

HARRY F. MANBECK, JR.

*Attesting Officer*  *Commissioner of Patents and Trademarks*